Oct. 18, 1955  F. F. MELVIN  2,720,745
LAWN RAKE
Filed May 19, 1953  3 Sheets-Sheet 3

INVENTOR
FRANCIS F. MELVIN
BY Herbert A. Minturn
ATTORNEY

United States Patent Office 2,720,745
Patented Oct. 18, 1955

2,720,745

LAWN RAKE

Francis F. Melvin, Elwood, Ind.

Application May 19, 1953, Serial No. 355,905

3 Claims. (Cl. 56—400.17)

This invention relates to a lawn rake, sometime termed a broom rake, wherein there is primarily a metallic head from which extend a plurality of flat ribbon-like tines with downcurved or downturned outer ends, a handle being affixed to the head.

A primary object of this invention is to provide the combination of an extremely sturdy construction with low cost of production. In the matter of low cost production, there is, of course, involved the use of the minimum amount of material, and also the minimum amount of fabricating including hand operations.

These and many other objects and advantages of the invention will become apparent to those versed in the art in the following description of one particular form of the invention as illustrated in the accompanying drawings, in which Fig. 1 is a view in top plan of a structure embodying the invention;

Figure 1:
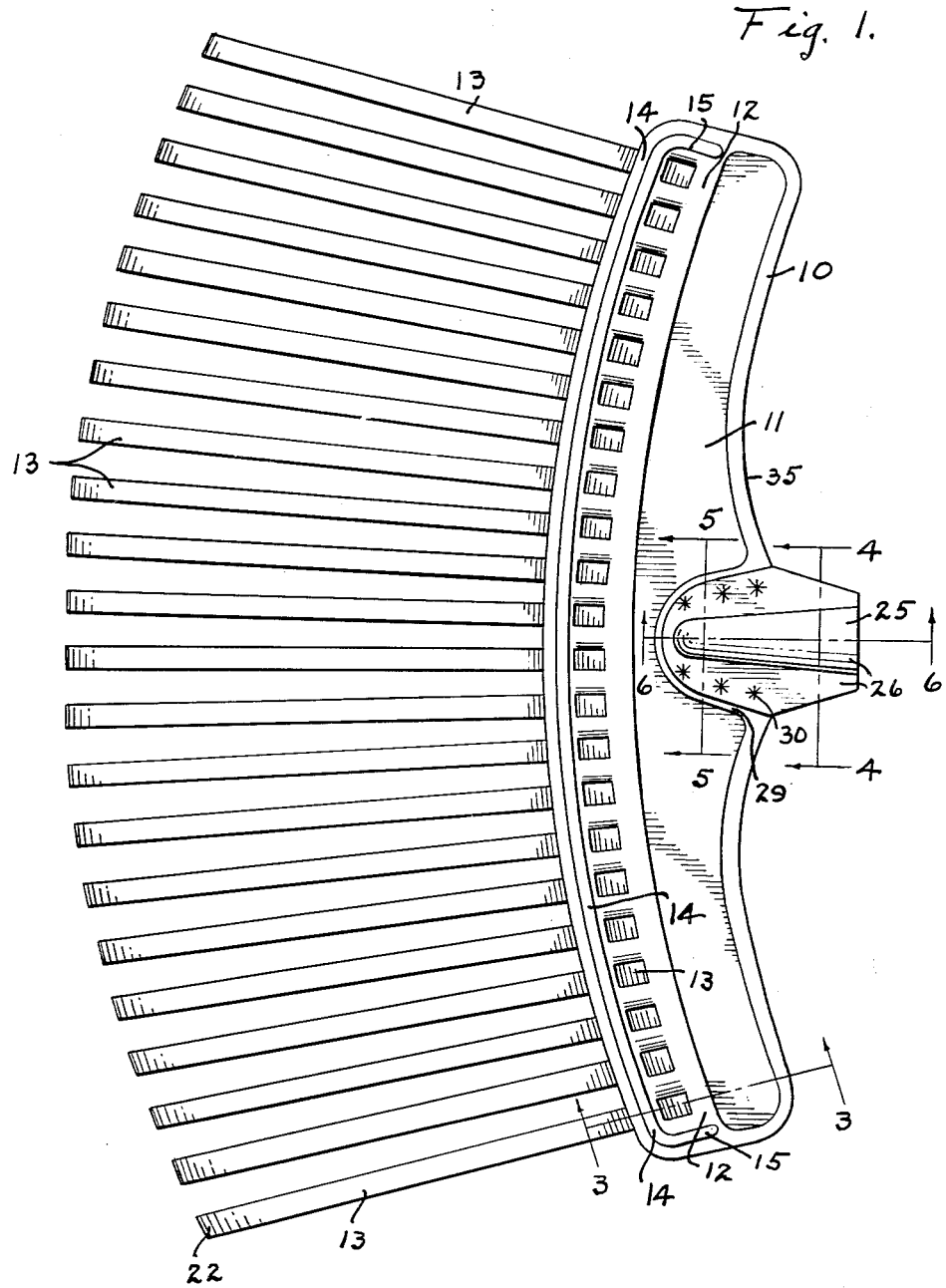
Figure 2:
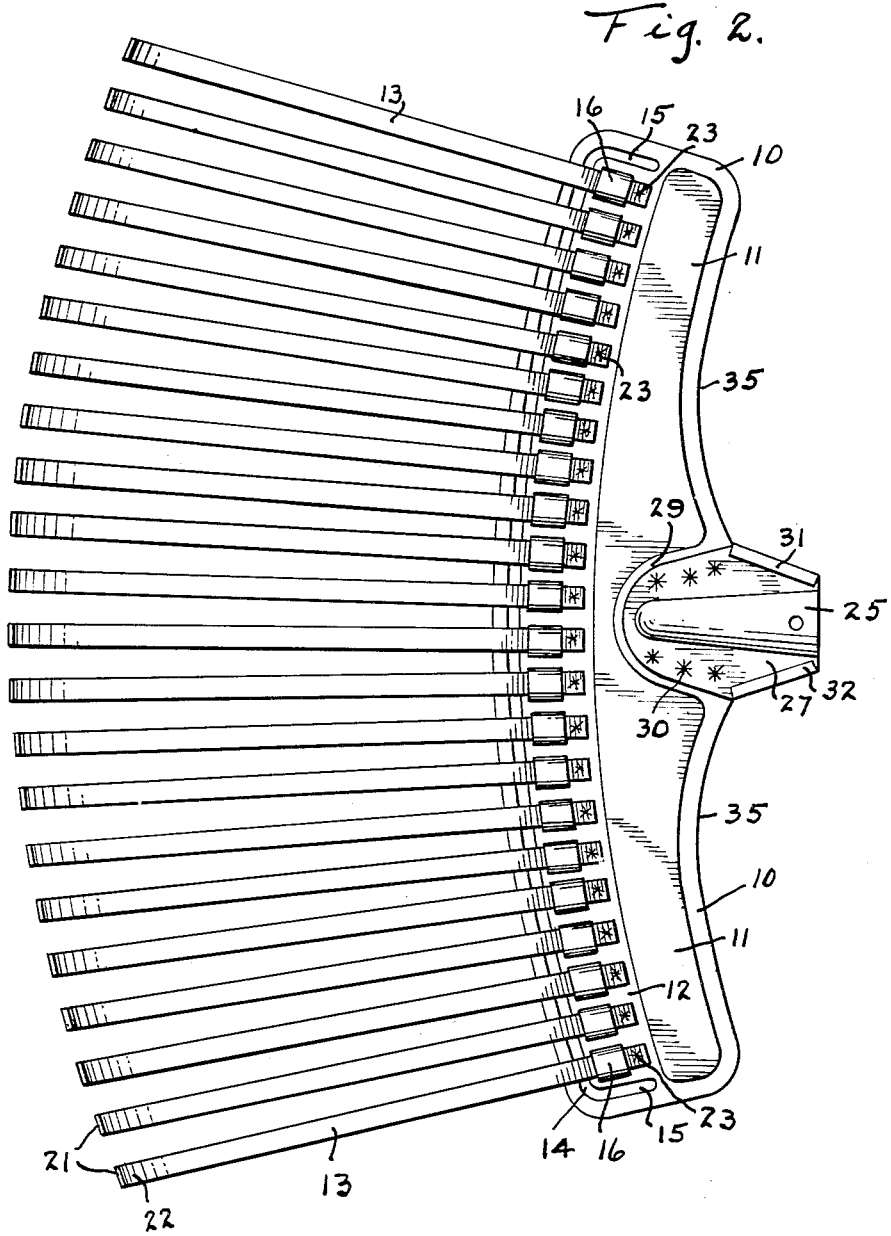
Fig. 2 is a view in bottom plan.

A head initially a generally arcuate plate and generally designated by the numeral 10 is pressed or stamped to have, Fig. 1, as viewed from the top, a depressed area 11 extending arcuately around the rear portion of the head. Then there is left an area 12 extending arcuately around and forwardly of the depressed area 11 to which the heel or rear ends of the tines 13 are secured. Forwardly of the flat surface 12, there is pressed upwardly a reinforcing rib 14 which has end returns 15, one on each end, extending rearwardly and substantially enclosing the ends of the area 12.

Figure 3:
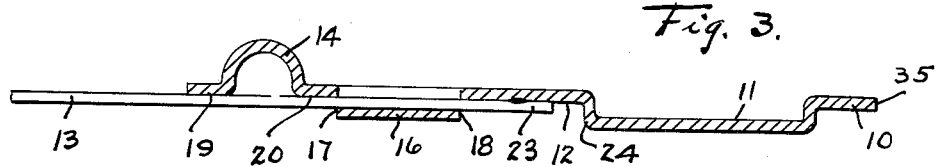
Fig. 3 is a section in detail on the line 3—3, Fig. 1, on an enlarged scale.

Around the forward portion of the flat area 12, the plate 10 is punched to carry downwardly portions of that area which in effect are straps 16 still integrally bonded to the area portion 12, but are pressed sufficiently downwardly to leave openings 17 and 18, Fig. 3, to permit a tine 13 to be pushed therethrough against the under side of the area 12.

Thus the bead or rib 14 appears over the top sides of the tines 13 to serve as a downwardly pressing medium when the rake is in use, and the tines 13 are being pushed against the ground or the surface being raked. That is to say, the under marginal areas 19 and 20 immediately adjacent the opening into the bead 14 from its under side are the portions which constitute the pressure medium against these tines 13.

Each of these tines 13 may be either initially assembled to the head 10 in the straight form, or they may be initially formed to have the downwardly turned ends 21, these ends 21 being the terminal ends of the tine after the tine is carried around through a bend 22. It is practically impossible to hold these bends 22 with sufficient accuracy in respect to the overall lengths of the tines 13 to have the effective lengths of the tines 13 equal in all instances with any great degree of exactitude. In other words, when the bends 22 are aligned around the arcuate outer line at which these tines 13 are terminated, the inner ends 23 may not be in a smooth arcuate line adjacent the downwardly pressed area 11, Fig. 3. In other words, there is left a clearance between the tine end 23 and the shoulder 24 at the forward end of the area 11, Fig. 3. When the tines are properly aligned in respect to their outer ends, the rear tine ends 23 are spot welded to the area 12, and thus fixed against longitudinal travel in respect to the head 10. Preferably, in assembly, the tines 13 are forced to some degree over the strap 16 in each instance and under the surfaces 19, 20 and 12 so that the outer alignment of the tines 13 is easily had and maintained. Of course, the straps 16 may be sufficiently depressed to permit a rather loose fit if desired by employing a fixture (not shown) to align the outer ends of the tines 13 and hold them while the spot welding is performed. In any event, when the rake is in use, and the tine ends 21 are pressed against the ground, there will be an initial bending zone at the surface 19, tending to bow the tine between that surface 19 and the opening 17 downwardly, but the tine 13 is thus held from bowing down to any appreciable extent by reason of its passage over the strap 16 which relieves any tendency to break the tine ends 23 away from the surface 12 rearwardly of the strap 16 and forwardly of the shoulder 24, this being the zone within which the spot welding occurs to retain the tine 13 in the fixed position as above indicated.

In order to transmit effectively the downward pressure to be exerted by a handle (not shown) attached to the head 10, a socket, generally designated by the numeral 25, is formed to have that pressure transmitted through the head 10 without any tendency to distort the head 10 so that the pressure is effectively transmitted to the tines 13 without bending of the head 10.

This socket 25 is formed of two pieces, an upper piece 26, and a lower piece 27, which are matched one with the other when laid one over the other to define the generally elongated conical opening 28 therebetween, into which opening the handle may be inserted in the usual and well known manner.

In order to mount these two pieces 26 and 27 on the head 10, the depressed section 11 is so formed centrally of the head 10 that there is left an area 29 entering forwardly of the head which is planar so that the area 11 is carried rearwardly around and also forwardly of this section or area 29 so as to permit the handle receiving members 26 and 27 to over and underlap this area 29 respectively.

Figure 4:
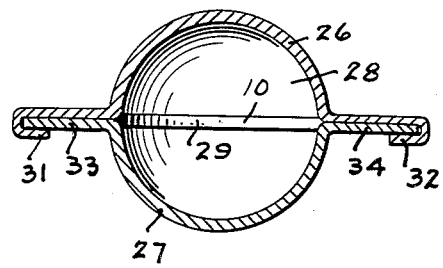
Fig. 4 is a detail in vertical section on the line 4—4 in Fig. 1.
Figure 5:
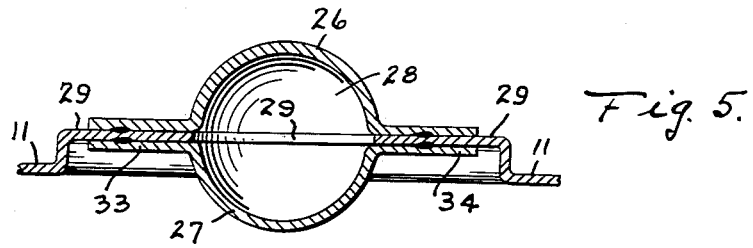
Fig. 5 is a transverse vertical detail on the line 5—5 in Fig. 1.
Figure 6:
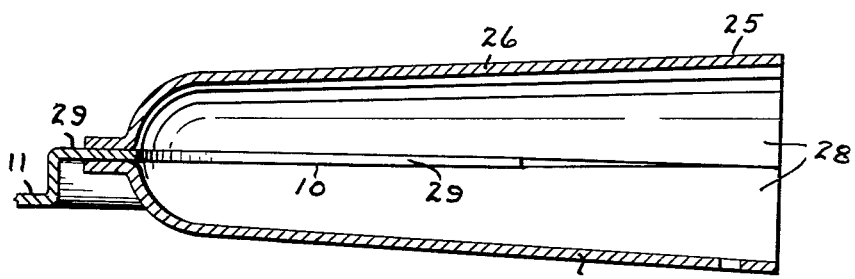
Fig. 6 is a detail in central vertical section on the line 6—6 in Fig. 1.

These two members 26 and 27 in the overlapping relationship, being properly aligned to define the conical opening therein, 28, are fixed to the area 29 by any suitable means, such as by spot welding 30, and then outer edge portions 31 and 32 as integral parts of the member 26 are carried around downwardly and under outturned flanges 33 and 34, Fig. 4, of the member 27 and pressed thereagainst to secure those two members together in that manner, this securement being had rearwardly of the terminal or marginal edge 35 of the head 10. The flat area portion 29 is preformed so as to be free of extension into the opening 28, Figs. 4–6, but to extend along the sides thereof, and be clamped between the two members 26 and 27.

In this manner, the handle socket 25 not only serves to receive the handle, but also serves exceedingly well as a reinforcing device of the central portion of the head 10.

Therefore, it is to be seen that in the structure described, a very simple construction as well as a most effective and long life structure is provided, and while the invention has been described in that one particular form in minute detail, it is obvious that structural changes may be employed, and it is desired that the invention not be limited to that precise form any more than may be required by the limitations which may be imposed by the following claims.

I claim:

1. In a lawn rake of the broom type, the combination of a head characterized by having an elongated flat area across the front portion thereof, a reinforcing rib along and adjacent the front edge of that flat area and extending upwardly therefrom and turning rearwardly across the end portions of that area, an embossed planar major area portion of the head having a front margin offset from said flat area and spaced rearwardly of said rib, extending laterally across the head, and a flat marginal edge portion extending in the same plane as said flat area rearwardly around ends of the embossed area and across its rear side; tines having heel portions secured to the under side of said flat area and extending forwardly under said area and said rib; said head further having a central zone flat portion entering said embossed area in the plane of said flat marginal edge portion terminating therearound by a shoulder integrally interconnecting the zone portion area through the shoulder with said embossed area; and a pair of handle socket members each shaped to define therein half of an elongated conical cavity and having laterally extending planar flanges; said socket members resting one each above and below on and over said central zone portion approaching said shoulder therearound by said flanges and extending rearwardly therefrom in overlapping contact one with the other back of the head; and means intersecuring said socket members one to the other through both said intervening head zone portion and directly one to the other back of said head.

2. The structure of claim 1 in which said shoulder around said central zone portion is arcuate and extends in close proximity to the margins of said socket member flanges.

3. The structure of claim 1 in which the socket members intersecuring means outside of said head comprises outer edge portions of the flanges of one member extending around the flange edges of the other portion in compressive clamping engagement.

References Cited in the file of this patent

UNITED STATES PATENTS

| | | |
|---|---|---|
| 2,252,114 | Brown | Aug. 12, 1941 |
| 2,315,021 | Schmidt et al. | Mar. 30, 1943 |
| 2,603,937 | Gundersen et al. | July 22, 1952 |